US012693773B2

(12) United States Patent　　(10) Patent No.: US 12,693,773 B2

Donohue　　(45) Date of Patent: Jul. 28, 2026

(54) MULTI-TIERED CONTENT NAVIGATION PROVIDED BY A GRAPHICAL USER INTERFACE

(71) Applicant: GloryMakeup Inc., Taipei City (TW)

(72) Inventor: Daniel Ariel Donohue, Miami, FL (US)

(73) Assignee: GloryMakeup Inc., Taipei City (TW)

( * ) Notice: Subject to any disclaimer, the term of this patent is extended or adjusted under 35 U.S.C. 154(b) by 204 days.

(21) Appl. No.: 18/608,726

(22) Filed: Mar. 18, 2024

(65) Prior Publication Data

US 2025/0291458 A1　　Sep. 18, 2025

(51) Int. Cl.
| | |
|---|---|
| *G06F 3/04817* | (2022.01) |
| *G06F 3/01* | (2006.01) |
| *G06F 3/0485* | (2022.01) |
| *G06F 3/0487* | (2013.01) |
| *G06T 11/60* | (2006.01) |

(52) U.S. Cl.
CPC .......... *G06F 3/04817* (2013.01); *G06F 3/013* (2013.01); *G06F 3/0485* (2013.01); *G06F 3/0487* (2013.01); *G06T 11/60* (2013.01)

(58) Field of Classification Search
CPC .... G06F 3/04817; G06F 3/013; G06F 3/0485; G06F 3/0487; G06T 11/60
See application file for complete search history.

(56) References Cited

U.S. PATENT DOCUMENTS

| | | | |
|---|---|---|---|
| 8,386,961 B2 | 2/2013 | Buffet | |
| 9,979,890 B2 | 5/2018 | Berstein | |

| | | | | |
|---|---|---|---|---|
| 2006/0101341 A1 * | 5/2006 | Kelly | ........... | G06F 16/957 |
| | | | | 707/E17.119 |
| 2008/0235872 A1 * | 10/2008 | Newkirk | ........... | G06F 3/0481 |
| | | | | 5/658 |
| 2012/0173975 A1 * | 7/2012 | Herz | ........... | H04N 21/8193 |
| | | | | 715/830 |
| 2019/0196673 A1 | 6/2019 | Bashev | | |
| 2019/0339772 A1 * | 11/2019 | Yoshida | ........... | G06F 3/013 |
| 2023/0165358 A1 * | 6/2023 | James | ........... | G06F 3/04842 |
| | | | | 132/294 |

OTHER PUBLICATIONS

International search report and written opinion, PCT/CN2024/087766, dated Nov. 28, 2024.

* cited by examiner

*Primary Examiner* — Seth A Silverman

(74) *Attorney, Agent, or Firm* — Tong J. Lee

(57) ABSTRACT

A graphical user interface (GUI) for content navigation displays a content area and multiple arcs. Each arc presents multiple icons associated with viewable features of a main subject in the content area. A first scroll input on a first arc moves a first set of icons out of the screen, moves a second set of icons into the screen, and positions a first icon at a designated position to select the first icon. In response to the first scroll input, the GUI displays an automatic scrolling motion of a second arc to present a subset of the icons on the second arc that correspond to the first icon. A second scroll input selects a second icon on the second arc. The GUI updates at least one of the viewable features of the main subject according to operations indicated by at least the first icon and the second icon.

20 Claims, 12 Drawing Sheets

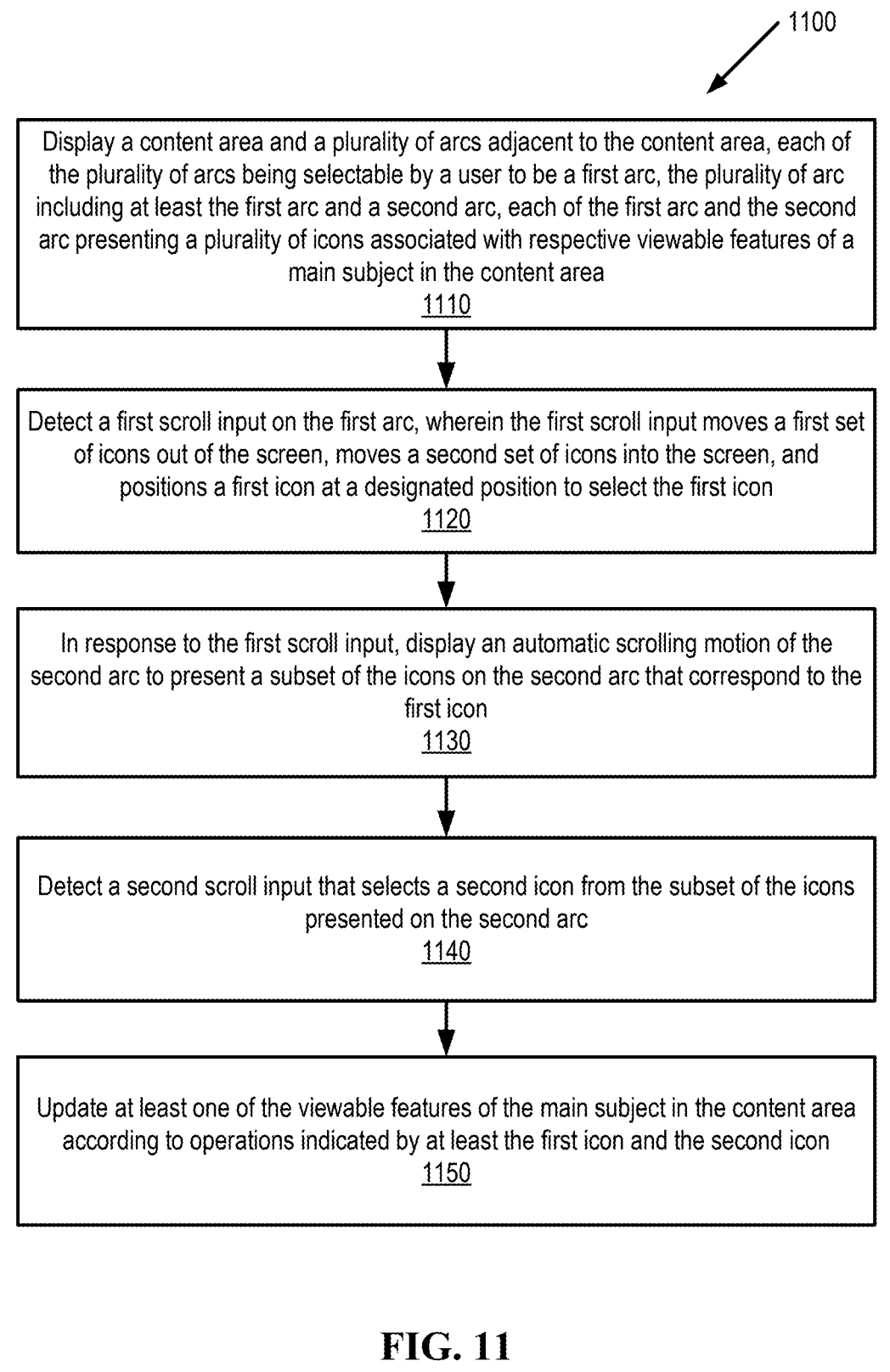

1100

Display a content area and a plurality of arcs adjacent to the content area, each of the plurality of arcs being selectable by a user to be a first arc, the plurality of arc including at least the first arc and a second arc, each of the first arc and the second arc presenting a plurality of icons associated with respective viewable features of a main subject in the content area
1110

Detect a first scroll input on the first arc, wherein the first scroll input moves a first set of icons out of the screen, moves a second set of icons into the screen, and positions a first icon at a designated position to select the first icon
1120

In response to the first scroll input, display an automatic scrolling motion of the second arc to present a subset of the icons on the second arc that correspond to the first icon
1130

Detect a second scroll input that selects a second icon from the subset of the icons presented on the second arc
1140

Update at least one of the viewable features of the main subject in the content area according to operations indicated by at least the first icon and the second icon
1150

FIG. 11

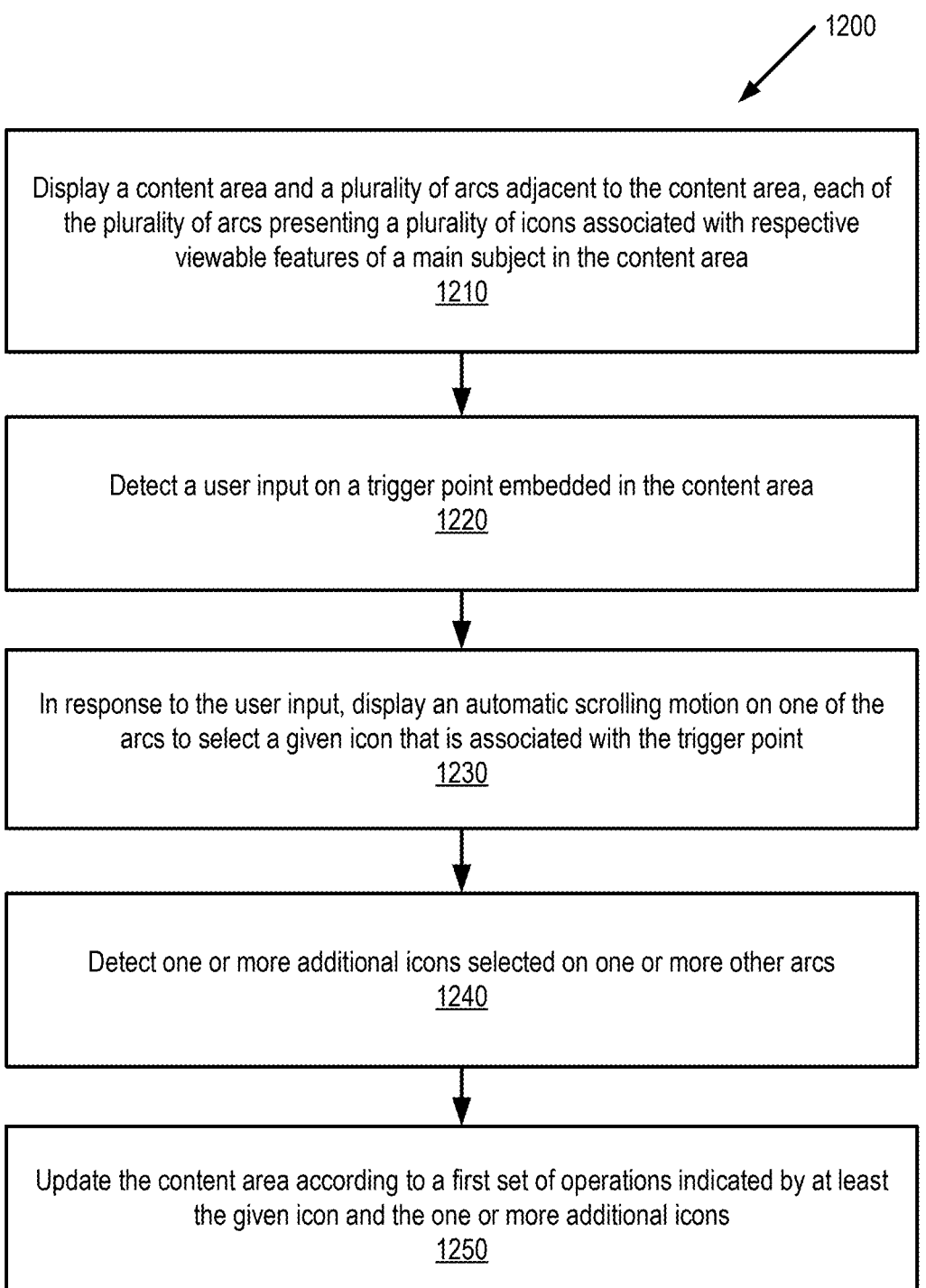

1200

Display a content area and a plurality of arcs adjacent to the content area, each of the plurality of arcs presenting a plurality of icons associated with respective viewable features of a main subject in the content area
1210

Detect a user input on a trigger point embedded in the content area
1220

In response to the user input, display an automatic scrolling motion on one of the arcs to select a given icon that is associated with the trigger point
1230

Detect one or more additional icons selected on one or more other arcs
1240

Update the content area according to a first set of operations indicated by at least the given icon and the one or more additional icons
1250

FIG. 12

MULTI-TIERED CONTENT NAVIGATION PROVIDED BY A GRAPHICAL USER INTERFACE

TECHNICAL FIELD

Embodiments of the invention relate to interaction mechanisms provided by a graphical user interface (GUI) on electronic input devices.

BACKGROUND OF THE INVENTION

Studies have shown that a website can lose about 50% or more of the visitors for every sequential page they must click on to find information or apply an action. The percentage of visitors to a particular website who navigate away from the site after viewing only one page is known as the bounce rate. However, portable devices such as smartphones typically have small screens that limit the amount of information displayable at a time. When an application provides multiple user-selectable options, a small screen size also limits the number of options displayable at a time. Requiring a user to navigate through multiple pages to perform a single action not only takes a longer time and wastes power, but also increases the bounce rate.

SUMMARY OF THE INVENTION

In one embodiment, a method of a GUI is provided for content navigation on a screen. The GUI displays a content area and multiple arcs adjacent to the content area. Each arc is selectable by a user to be a first arc. The multiple arcs include at least the first arc and a second arc, each of the first arc and the second arc presenting multiple icons associated with respective viewable features of a main subject in the content area. The GUI further detects a first scroll input on the first arc. The first scroll input moves a first set of icons out of the screen, moves a second set of icons into the screen, and positions a first icon at a designated position to select the first icon. In response to the first scroll input, the GUI displays an automatic scrolling motion of the second arc to present a subset of the icons on the second arc that correspond to the first icon. The GUI further detects a second scroll input that selects a second icon from the subset of the icons presented on the second arc; and updates at least one of the viewable features of the main subject in the content area according to operations indicated by at least the first icon and the second icon.

In another embodiment, a device comprises a screen, one or more processors, and a memory to store instructions, which when executed by the one or more processors, cause a GUI on the screen to display a content area and multiple arcs adjacent to the content area. Each arc presents multiple icons associated with respective viewable features of a main subject in the content area. The GUI detects a user input on a trigger point embedded in the content area. In response to the user input, the GUI displays an automatic scrolling motion on one of the arcs to select a given icon that is associated with the trigger point. The GUI detects one or more additional icons selected on one or more other arcs, and updates the content area according to a first set of operations indicated by at least the given icon and the one or more additional icons.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 11 is a flow diagram illustrating a method of a GUI for content navigation according to one embodiment.

FIG. 12 is a flow diagram illustrating a method of a GUI for content navigation according to another embodiment.

DETAILED DESCRIPTION OF THE INVENTION

Figures 1A, 1B, 1C:
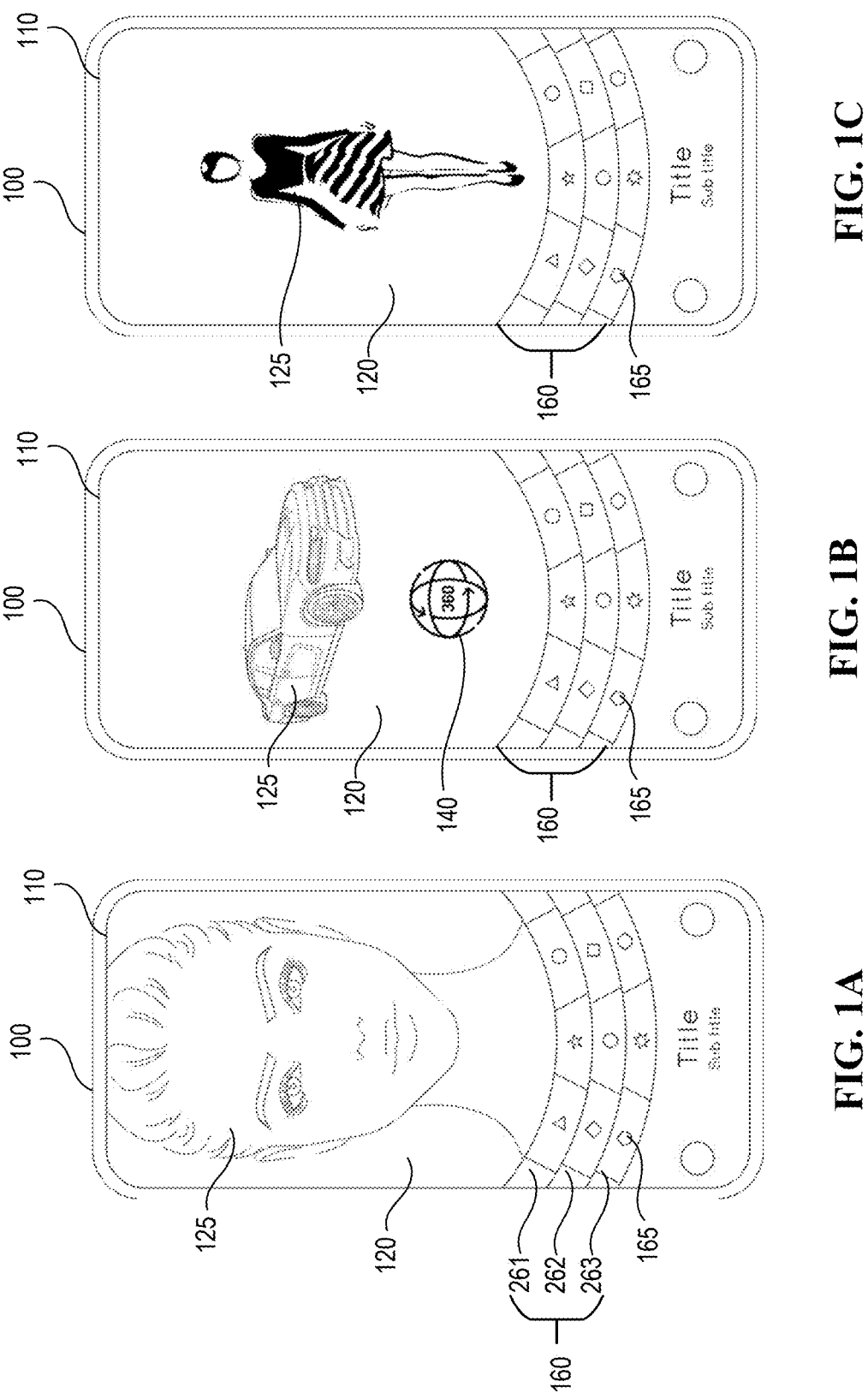
FIG. 1A, FIG. 1B, and FIG. 1C illustrate examples of a GUI for content navigation according to one embodiment.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The disclosed content navigation mechanism interacts with a user of a software application that runs on an electronic device. In one embodiment, the device displays a graphical user interface (GUI) on a screen. The GUI presents a main subject in a content area and multiple navigation arcs (also referred to as "arcs') adjacent to the content area. The arcs are arranged in multiple tiers for content navigation. The tiers represent a hierarchy of information regarding the main subject, or a hierarchy of actions to be performed on the main subject. The GUI further presents multiple icons on each arc. A user may scroll through the icons on each arc by swiping towards either the right end or the left end of the arc.

In one embodiment, each icon is associated with a viewable feature of the main subject. When a user scrolls an arc, a first set of icons is moved out of the screen and a second set of icons is moved into the screen. When the user selects an icon on a first arc, a second arc is updated to show those icons corresponding to the selected icon on the first arc. In one embodiment, a user may tap on a trigger point embedded in a feature of the main subject on the screen to select a corresponding icon on one of the arcs.

The disclosed content navigation mechanism improves the bounce rate by enabling a user to view a hierarchy of available options without moving around pages. By contrast, a user of a conventional multi-page presentation format would have to move around pages to view available options. Such a multi-page format can discourage the user to stay and therefore can cause a higher bounce rate. Some other one-page presentation formats cram all information onto one page to mitigate the bounce rate issue; however, too much information displayed all at once can be confusing to the users. The disclosed content navigation organizes all of the available options into tiers of options; e.g., tiers of categories and subcategories. Thus, a user can easily preview the total depth of the available options and have an easy time navigating among the options on a single page.

Throughout the disclosure the term "icon" is used to refer to a selectable marking on an arc, and a selectable marking may include a graphical symbol, a color, and/or one or more words. In one embodiment, a user may select an icon by tapping on an arc segment containing the icon. In an alternative embodiment, a user may select an icon by scrolling the arc to position the icon at a designated position; e.g., at the middle or marked position of the arc. As each icon represents a user-selectable option, the terms "icon" and "option" may be used interchangeably in the disclosure. Each icon represents operations to be executed by the device that displays the icons. Thus, when a user selects one or more icons on one or more arcs, the user causes the device to execute the operations represented by the selected icons and show the result in a content area (e.g., content area 120 in FIG. 1A) of the display.

FIG. 1A illustrates an example of a GUI 110 on a screen 100 that provides content navigation according to one embodiment. The GUI 110 displays multi-tiered arcs 160 adjacent to a content area 120 in which a main subject 125 such as a human face is presented. Other non-limiting examples of the main subject 125 include a car (FIG. 1B), a fashion model (FIG. 1C), etc. The media formats of the main subject 125 may include photos, videos, augmented reality (AR), 360° virtual 3D models, computer-generated graphics, and video and text interactive media. The GUI 110 can easily adapt to a wide variety of applications.

Although three tiers of arcs 160 are shown in this example, it is understood that the number of tiers can be any number greater than one. Displayed on each arc are icons, which are shown as geometric shapes in this example to simplify the illustration. One of the icons (e.g., icon 165) is labeled as an example. The icons may be associated with viewable features of the main subject 125. In the example of FIG. 1A, different icons may represent different makeup options that users may choose to apply on their facial features. Options in the lower tiers are dependent on the options in one or more tiers above it; thus, the options form an option hierarchy. By displaying the arcs 160, the GUI 110 presents the option hierarchy on the screen 100 such that a user can see the depth of available options before selecting an option.

Each arc 160 occupies one tier; the top-tier arc is referred to as the top arc (e.g., top arc 261). In the examples of FIG. 1A-FIG. 1C, the top arc 261 is the arc nearest the content area 120. In alternative embodiments, the arcs 160 may be displayed at a different position than what is shown in FIG. 1A-FIG. 1C, and the top arc may be displayed at the top, middle, or the bottom of the arcs 160. Thus, the term "top arc" refers to the arc at the top tier of the option hierarchy and is not necessarily displayed on top of the other arcs.

The number (Nt) of icons in a tier may sometimes exceed the number (Nd) of icons that can be displayed on an arc. When Nt>Nd, which means there is not enough space on the arc to show all of the icons in that tier, a user may scroll the arc in either direction in order to see all of the icons in that tier. Thus, each arc is the on-screen (i.e., visible or displayed) portion of a virtual wheel; when the virtual wheel rotates (e.g., by a user scrolling left/right or clockwise/counterclockwise on the arc), a previously off-screen portion of the virtual wheel enters the screen 100 and becomes visible while a previously on-screen portion leaves the screen 100. Each of the virtual wheels may rotate by the user independently of one another; that is, the order in which the arcs 160 are scrolled is not predefined and can be determined by the user.

In one embodiment, the arcs 160 are portions of concentric wheels that are displayed on the screen 100, and each wheel may be circularly shaped. Alternatively, the arcs 160 can be open curves of any curvature. Each arc has two ends and a middle section that curves away from the content area 120. That is, the middle section is curved to provide more visual space for the content area 120 to display contents. The middle section is bounded by an inner curve (which is proximal to the content area 120) and an outer curve (which is distal to the content area 120). The distance between the inner curve and the outer curve defines the thickness of the arc. In an embodiment where the arcs 160 are located below the content area 120, the two ends are higher than the middle point of the arc such that the content area 120 has more visual space in the center to display contents. The content area 120 may include additional content navigation or manipulation widgets; e.g., FIG. 1B shows a 3D navigation widget 140 in the content area 120 to allow the user to have a 360-degree view of the car.

In alternative embodiments, the shape and/or position of the arcs 160 may be different from what is shown in this disclosure. For example, a vertical or horizontal bar may be used instead of the arc. In some embodiments, the arcs may be a part of ellipses or other geometric shapes. The arcs may be positioned on top of the content area 120 or the screen 100, on a corner of the content area 120 or the screen 100, on the right/left side of the content area 120 or the screen 100, or another location. In some embodiments, an arc may have non-uniform thickness from one end to another; e.g., the middle portion of the arc may be thicker than the other portions or vice versa.

Referring to FIG. 1A, each icon displayed on the top arc 261 represents a category, and the icons displayed on the rest of the arcs 160 (referred to as dependent arcs 262, 263) represent subcategories corresponding to the categories in the top tier. The subcategories shown on the dependent arcs 262, 263 depend on the category selected on the top arc 261. In some embodiments, each category corresponds to a viewable feature of the main subject 125, and its corresponding subcategories describe the attributes of that category. For example, a category in FIG. 1A may be eyeshadow to be applied on the main subject's eyelids, and the eyeshadow/eyelid category may include shape subcategories in one tier and color subcategories in another tier. Techniques for content navigation using the arcs 160 are described below with reference to FIG. 2.

Figure 2:
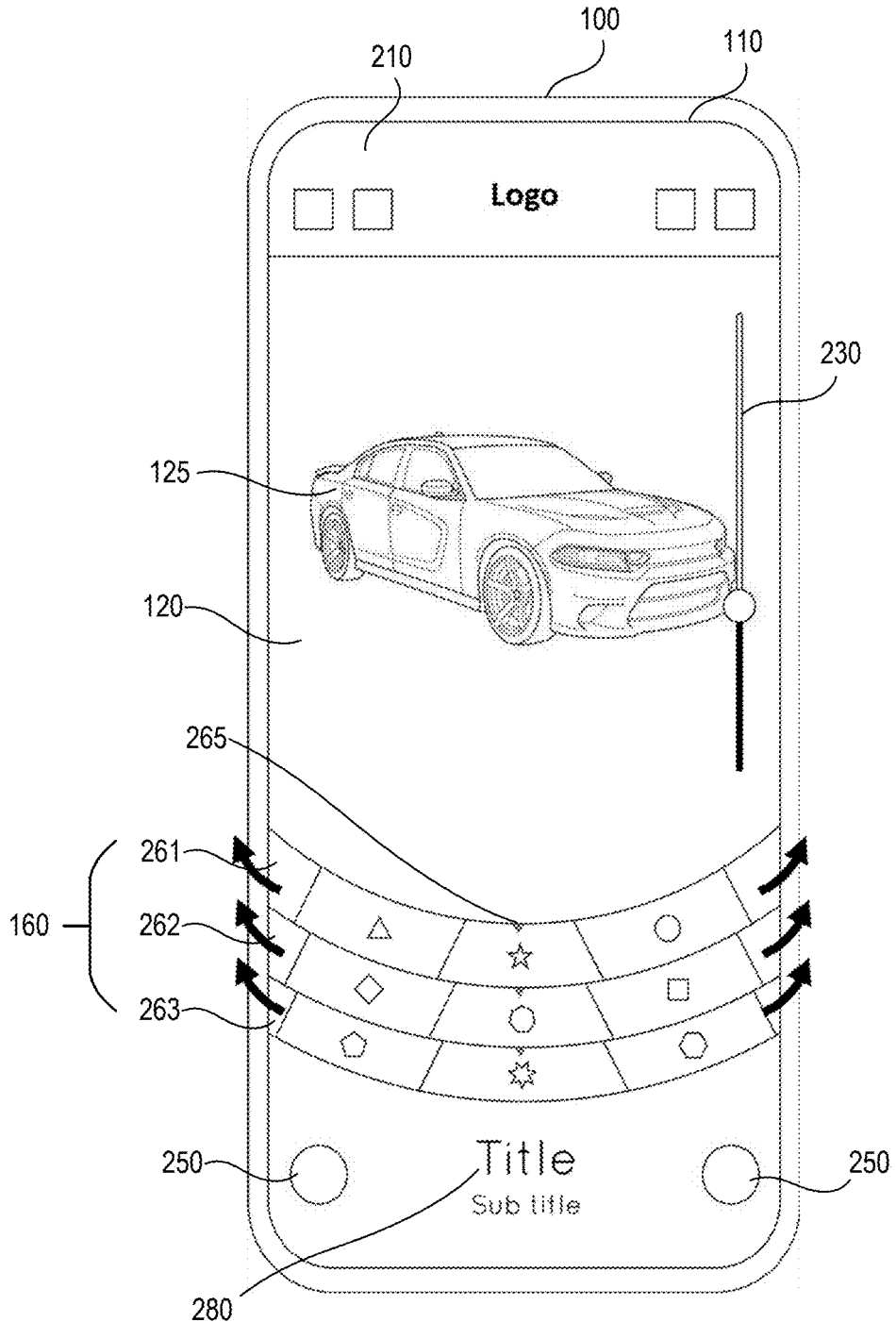
FIG. 2 illustrates an example of a GUI with a content area showing a car as a main subject according to one embodiment.

FIG. 2 illustrates an example of the GUI 110 with the content area 120 showing a car as the main subject 125 according to one embodiment. A user may scroll either right or left (alternatively, clockwise or counterclockwise) on any arc in any tier to see the icons, and may select an icon on any arc in any tier by positioning the icon at a designated position; e.g., at the middle point of the arc. In one embodiment, a marker 265 on one or more of the arcs may be used to indicate the designated position. In one embodiment, the user may click-and-hold on the marker 265 of an arc to view alternative options provided by the arc. By selecting one of the alternative options, the arc may present a different set of icons. Thus, the user can customize the options displayed and selectable on the arc. To simplify the illustration, all of the icons in this example are shown as geometric shapes.

It is noted that each arc (261, 262, or 263) can be scrolled by a user independently of one another; that is, a user is not restricted to scrolling the arcs 160 according to a predetermined order. A user can select any one of the arcs 160 to scroll first. A user can scroll the arcs 160 from the top tier to the bottom tier of the option hierarchy; alternatively, a user can select a mid-tier arc (e.g., arc 262) or the bottom-tier arc (e.g., arc 263) to scroll first. When an icon on any of the arcs 160 is selected, the GUI 110 displays on the other arcs only those icons corresponding to the selected icon. In one embodiment, the GUI 110 may show automatic scrolling motions on the other arcs when updating the displayed icons on those arcs. At this point, when the user scrolls the other arcs in either direction, only a subset of the icons corresponding to the selected icon are displayed.

In one embodiment, the icons displayed on the arc 263 are dependent on the selected icon on the arc 262. In an alternative embodiment, the icons displayed on the arc 263 may be dependent on the icon selected on the top arc 261 and independent of icons on the arc 262. When a user selects a category icon on the top arc 261, the dependent arcs 262 and 263 are automatically scrolled to show the corresponding subcategory icons. When a user selects a subcategory icon on one of the dependent arcs 262 or 263 before selecting a category icon on the top arc 261, the top arc 261 is automatically scrolled to show the corresponding category icon(s), and the icons on any other dependent arcs are also automatically scrolled to show the corresponding icons according to the dependency. For example, a user can first select an eyebrow makeup category on the top arc 261, followed by eyebrow shape and color subcategories on the arc 262 and 263, respectively. Alternatively, a user can first select the black color subcategory on the arc 263. Then the GUI 110 automatically updates (e.g., by automatic scrolling) the top arc 261 to show only the makeup categories that use the black color, and also updates (e.g., by automatic scrolling) the arc 262 to show the corresponding shape subcategories. The result or effect of the selected icons is displayed in the content area 120; e.g., on one or more viewable features of the main subject 125.

The GUI 110 also presents a number of virtual buttons 250 that can be programmed to show different viewing modes in the displayed content. For example, when the content area 120 shows an exterior view of a car, one of the virtual buttons 250 may be toggled to switch between the exterior view and the interior view of the same car. When the virtual button 250 is toggled between views, the user's selected icons (e.g., a selected category) made in one view is maintained in the other view. Information about the selected icons (i.e., options) may appear in an information area 280; e.g., at the top or bottom of the GUI 110. In one embodiment, the information area 280 displays information regarding displayed content in the content area 120, such as the results of user's selection, the most recent user action that caused a most recent change in the content area 120, etc. In one embodiment, the information area 280 may show the user's immediately preceding action; e.g., showing in text that the user has just selected a pink blush color.

When the main subject 125 is a face or a fashion model, pressing a virtual button 250 may provide the view of makeup products on the face or the clothing products on the fashion model in the content area 120. For example, by selecting the icons on the arcs 160, the user can create a makeup look on the face shown in the content area 120. Pressing the virtual button 250 changes the makeup look view to the product view, which shows in the content area 120 the makeup products used to create the corresponding makeup look on the face. Pressing the same virtual button 250 or a different one of the virtual buttons 250 may switch the view in the content area 120 from the product view back to the makeup look view. Changing the view in the content area 120 does not change the settings selected on the arc 160; that is, the GUI 110 maintains the displayed and selected icons on the arcs 160 when the displayed content in the content area 120 switches from one view to another.

The virtual buttons 250 allow the user to access different functions to change the content area viewing options without navigating to other pages. Pressing the virtual buttons 250 does not change the options that have been selected on the arcs 160. The function button 250 can change the view of the main subject 125, such as switching between an outside view and an inside view of a car, between a selected makeup look on a face and makeup products for creating the selected makeup look, between a view of a fashion model in an outerwear and a view of the fashion model in matching inner layers, or other views as required by the application.

In one embodiment, the GUI 110 may include a top bar 210 showing additional options and/or information regarding the main subject 125, the device status, and/or software applications running on the device. The top bar 210 may be retractable. In one embodiment, the GUI 110 may include a slider bar 230 that may be programmed according to the requirement of the application.

Figure 3B:
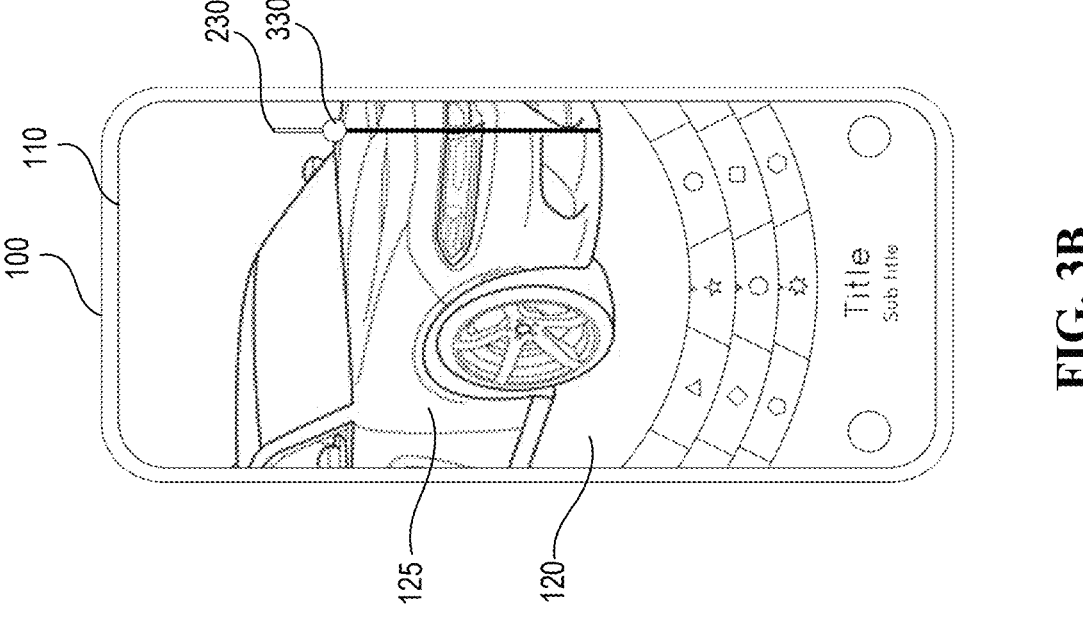
FIG. 3A and FIG. 3B illustrate an example of slider bar functions according to one embodiment.
Figure 3A:
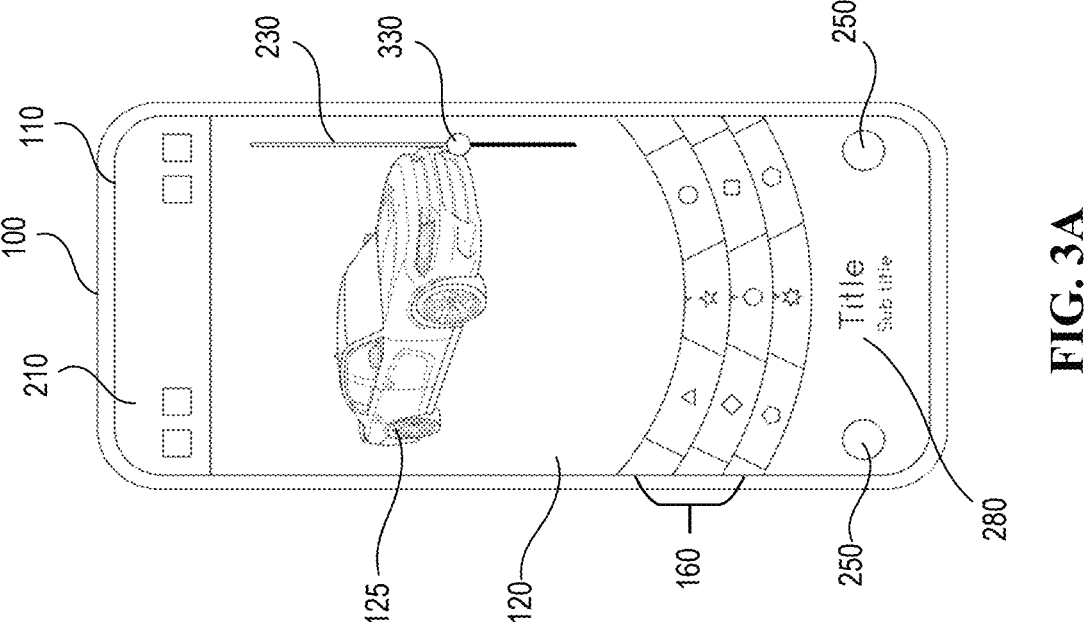

FIG. 3A and FIG. 3B illustrate an example of slider bar functions according to one embodiment. The slider bar 230 is a multi-functional slider bar having programmed options according to the use case for the navigation. In one embodiment, the function of the slider bar 230 is dependent on the content shown in the content area 120. The slider bar 230 can be used to modify a feature of the main subject 125 or elsewhere in the content area 120 without a user navigating to other pages and without the GUI 110 changing the displayed and selected icons on the arcs 160.

In this example, the slider bar 230 is programmed to allow a user to adjust the zoom factor of the main subject 125 (e.g., a car). The slider bar 230 may include a button 330 or another form of a draggable marker. A user may slide the slider bar 230 by dragging the button 330 along the slider bar 230. FIG. 3A shows a first position of the button 330 on the slider bar 230. FIG. 3B shows the button 330 moves up the slider bar 230 to zoom in on the car. When the displayed content in the content area 120 is accompanied with an audio output (e.g., music), the slider bar 230 may be used to adjust the volume of the audio. When the content area 120 displays a makeup look on a face, the slider bar 230 may be used to adjust the color intensity or transparency of the makeup.

When the content area 120 displays a fashion model, the slider bar 230 may be used to adjust the fabric color or texture of the dress on the fashion model. In one embodiment, a user may click-and-hold on the button 330 to see available slider bar functions such as the control of the zoom factor, audio volume, color intensity, color transparency, texture, etc. Text or symbols may be shown next to the slider bar 230 to inform the user of the available slider bar functions and/or the selected slider bar function.

In one embodiment, one or more of the controls, selectors, and areas may disappear and appear on the GUI 110 on demand. These controls, selectors, and areas are referred to as on-demand widgets and may include the top bar 210, the information area 280, the slider bar 230, the virtual buttons 250, the arcs 160, etc. It is noted that the setting (e.g., the selected options) on an on-demand widget remains unchanged when it disappears from the GUI 110 and re-appears. In one embodiment, an on-demand widget may disappear from the GUI 110 when a first user action is detected, and may appear on the GUI 110 when a second user action is detected. In one embodiment, an on-demand widget may disappear from the GUI 110 when a user's inaction is detected (e.g., after a predefined period of unuse), and may appear when a tapping or touching action is detected on or near the location of the on-demand widget. Temporarily removing one or more of the on-demand widgets from the GUI 110 can increase and/or declutter the content area 120 such that the user can more clearly view the displayed content in the content area 120. For example, the top bar 210 may disappear when the button 330 moves up to zoom in on the main subject 125, and may reappear when the button 330 moves down to zoom out. The GUI 110 may display the slider bar 230 on the screen 100 when a slider bar function is enabled. For example, when the main subject 125 is a face and one of the slider bar functions is to adjust the intensity of a makeup color, the slider bar 230 appears on the screen 100 after the user selects the shape and color(s) of the eyeshadow, or a color of the lipstick. After the user drags the button 330 on the slider bar 230 to select a setting, the slider bar 230 may disappear from the GUI 110 after a predefined period of unuse. In one embodiment, when the slider bar 230 is not shown on the GUI 110, the user may tap on the GUI 110 on or near the location of the slider bar 230 in the content area 120 to cause the slider bar 230 to appear. Similarly, after the user makes selections on the arcs 160, the arcs 160 may disappear from the GUI 110 after a predefined period of unuse. In one embodiment, when the arcs 160 are not shown on the GUI 110, the user may tap on the GUI 110 on or near the location of the arcs 160 to cause the arcs 160 to appear. In one embodiment, one or more sensors may be embedded in or adjacent to the screen 100 to detect the user's motion, gesture, and/or gaze. For example, the content area 120 and the main subject 125 may be enlarged when the sensors detect that the user is leaning toward the screen 100 and/or that the user's gaze is focusing on the content area 120 and/or the main subject 125 for a pre-defined period of time. Moreover, some or all of the on-demand widgets may disappear from the GUI 110 in response to the sensor detection of the user's motion, gesture, and/or gaze. In one embodiment, the effect of the arcs 160 disappearing from the GUI 110 may be achieved by the GUI 110 showing the arcs 160 with continuously-increasing radiuses while keeping the concentric center (which is invisible) of the arcs 160 at a fixed location. The arcs 160 disappear from the GUI 110 when the radius increase causes the arcs 160 to be off-screen.

Figure 4:
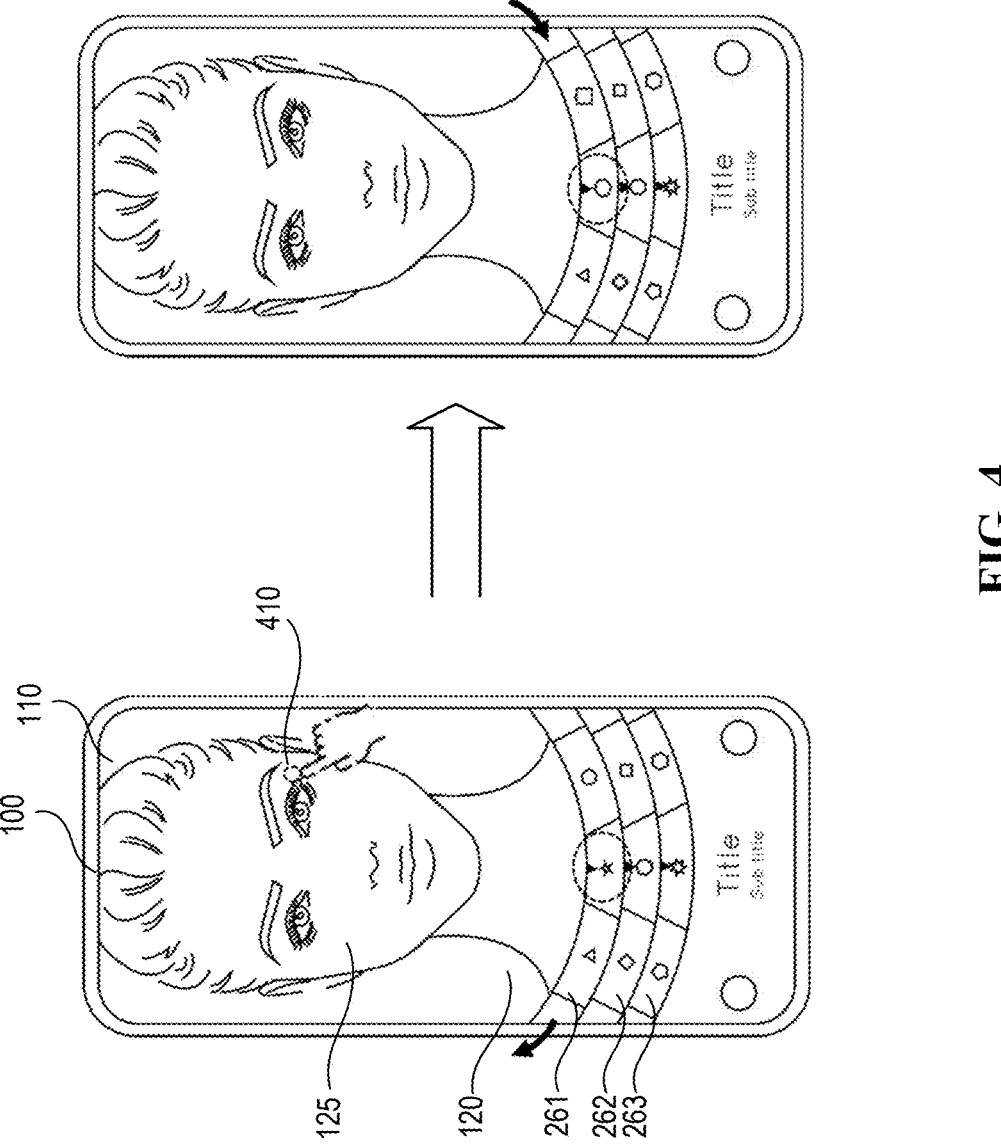
FIG. 4 illustrates a mechanism for content navigation according to one embodiment.

FIG. 4 illustrates a mechanism for content navigation according to one embodiment. In this example, the main subject 125 is a face, and a user may select the icons provided on the arcs 261, 262, and 263 to view the effect of the selected makeup on the face. The icons on the top arc 261 represent makeup steps such as the steps of applying the makeup foundation, blush, eyeshadow, lipstick, etc. One approach for a user to select a makeup step is by selecting an icon on the top arc 261. Alternatively, a user may select an area or a feature of the face on the screen 100 to select a makeup step. For example, a user may select an eyelid on the face, which causes the top arc 261 to automatically scroll to the position of the eyelid icon (e.g., by placing the eyelid icon at the designated position or the marker position). After the eyelid icon is selected, the GUI 110 automatically populates the dependent arcs 262 and/or 263 with icons of eyeshadow shapes and eyeshadow colors.

In one embodiment, the GUI 110 may embed trigger points on features of the main subject 125 or anywhere in the content area 120. A trigger point may be an area within the content area 120, which, when clicked or tapped by the user, causes a corresponding icon in one of the tiers to be selected. This corresponding icon in the tier may or may not currently be displayed on the screen 100. More specifically, when the user clicks on one of these trigger points, the GUI 110 automatically scrolls an arc such that a selected icon, whether on or off screen, is moved to the designated position. In one embodiment, the trigger points may be invisible; alternatively, a trigger point may become visible when a user touches the screen 100 in the vicinity of that trigger point or hovers a cursor over the trigger point. In one embodiment, the selection based on a trigger point may override a previously selected option as shown in the example of FIG. 4. Before the trigger selection shown on the left side of FIG. 4, the "Star" icon on the top arc 261 is scrolled to the marker position; i.e., the "Star" icon is selected. At this point, the user clicks on a trigger point 410 located on an eyelid of the face. The right side of FIG. 4 shows that the top arc 261 is automatically scrolled to the "Circle" icon representing the eyelid category. The GUI 110 then displays the subcategories of the eyelid category on the dependent arcs 262 and/or 263.

Figure 5C:
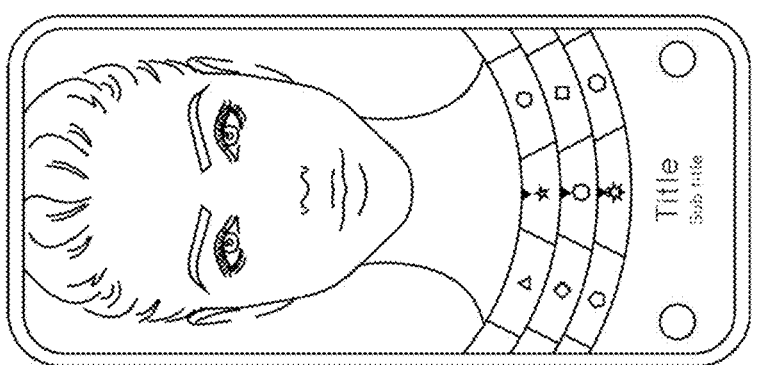
FIG. 5A, FIG. 5B, and FIG. 5C illustrate opening a set of partially closed arcs according to one embodiment.
Figure 5B:
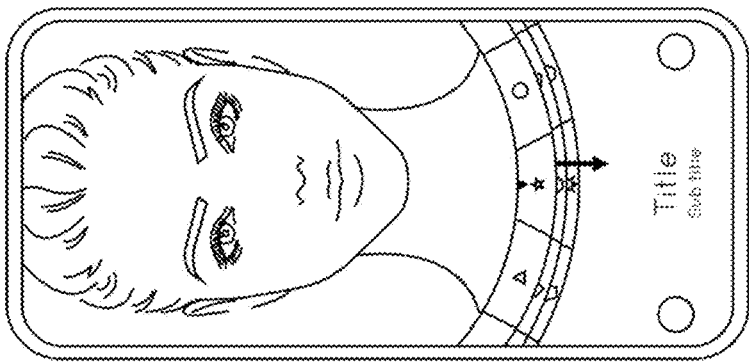
Figure 5A:
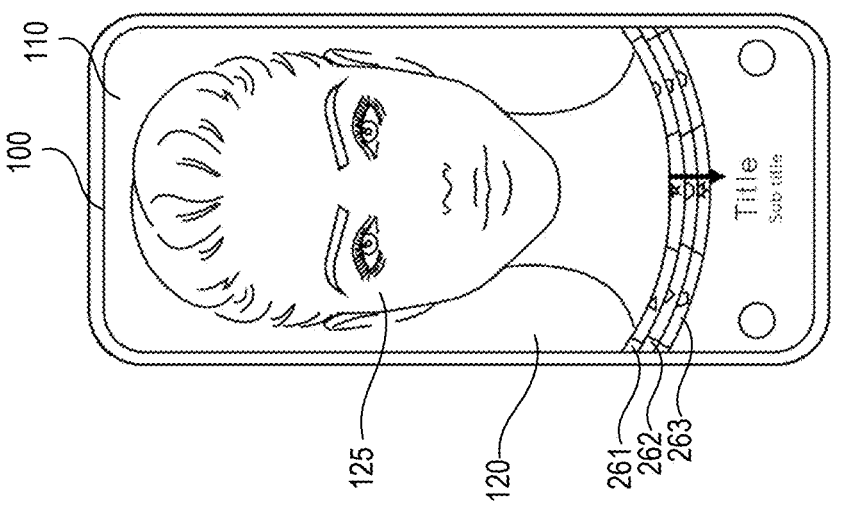

FIG. 5A, FIG. 5B, and FIG. 5C illustrate mechanisms for opening a set of partially closed arcs according to one embodiment. A partially closed arc is an arc that is partially hidden from view; that is, only a portion of the arc's thickness is visible on the screen 100 from one end to the other end of the arc. Closing the arcs can provide more space to the content area 120 for showing the main subject 125. Partially showing each closed arc allows the user to see the depth of available options in the option hierarchy.

In the example of FIG. 5A-FIG. 5C, when the GUI 110 detects a swipe-down input on a partially closed arc, the GUI 110 causes the partially closed arc to open. Conversely, when the GUI 110 detects a swipe-up input on an open arc, the GUI 110 causes the open arc to partially close. In one embodiment, a user may open and close each arc separately by swiping down and up, respectively, on each arc. In another embodiment, a user may open or close all the arcs together in one swipe. In yet another embodiment, the top arc 261 may be opened and closed separately while the dependent arcs 262 and 263 are opened and closed together. In FIG. 5A with all three arcs partially closed, a user can see the number of tiers representing the depth of available options before selecting an option. FIG. 5B shows a first swipe-down input that opens the top arc 261. The GUI 110 shows the main options (i.e., categories) and the selected main option at the marker position. At this point, the user can see the selected main option and is aware of the additional options to choose from if so desired. FIG. 5C shows a second swipe-down input that opens the second and third arcs (i.e., the dependent arcs 262 and 263). At this point, all arcs are opened. A user can select an option from each open arc and see the effect of the selected options on the main subject 125.

It is noted that the arcs in some embodiments the arcs 261, 262, and 263 may be oriented differently from what is shown in FIG. 5A-5C. A user may swipe on the arcs 261, 262, and/or 263 in a first direction away from the content area 120 to expand (i.e., open) one or more of the partially-closed arcs along the first direction. A user may also swipe on the arcs 261, 262, and/or 263 in a second direction toward the content area 120 to partially close one or more of the open arcs along the second direction. The first direction is opposite to the second direction.

Figure 6C:
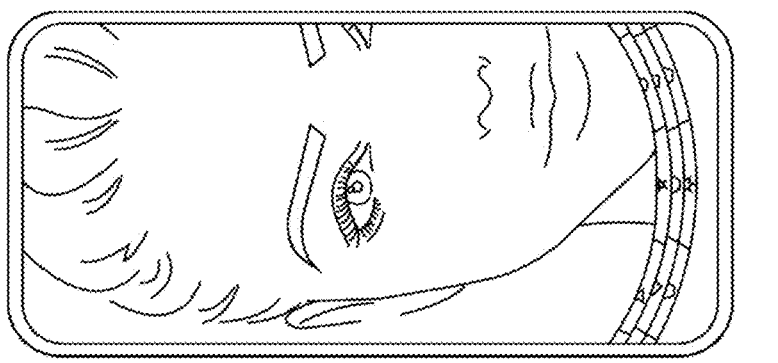
FIG. 6A, FIG. 6B, and FIG. 6C illustrate enlarging the main subject in the content area according to one embodiment.
Figure 6B:
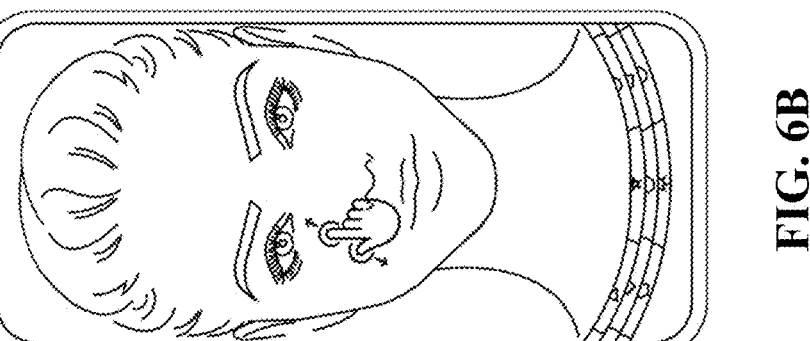
Figure 6A:
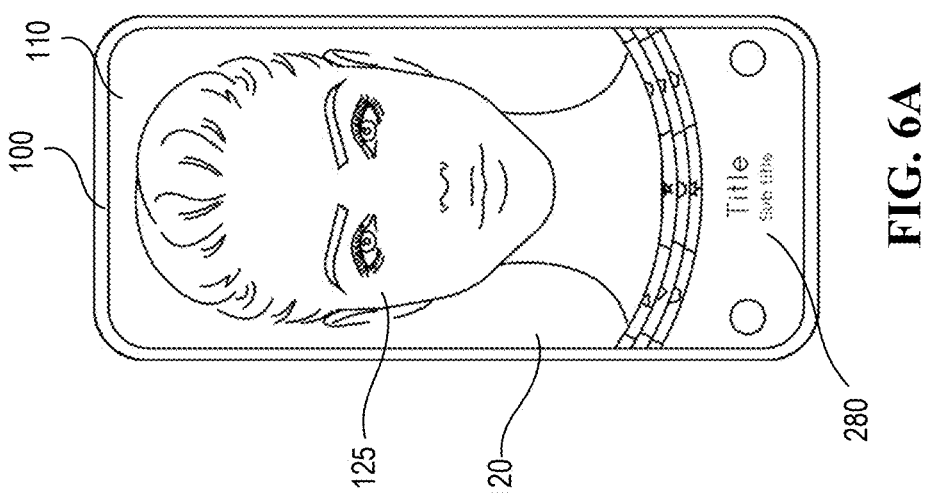

FIGS. 6A, 6B, and 6C illustrate mechanisms for enlarging the main subject in a content area according to one embodiment. FIG. 6A illustrates the content area 120, the main subject 125, and the information area 280. As described above in connection with FIG. 3A, the information area 280 may be removed from the GUI 110 after a time period of user inaction. Furthermore, the information area 280 may be removed from the GUI 110 when it is detected that the user's gaze is focused on the main subject 125 for a period of time. FIG. 6B illustrates that the main subject 125 may be enlarged (i.e., zoomed in) in the content area 120 by a user's pinch-to-zoom action. Furthermore, the main subject 125 may be enlarged in the content area 120 when it is detected that the user's gaze is focused on the main subject 125 for a period of time.

Figure 7B:
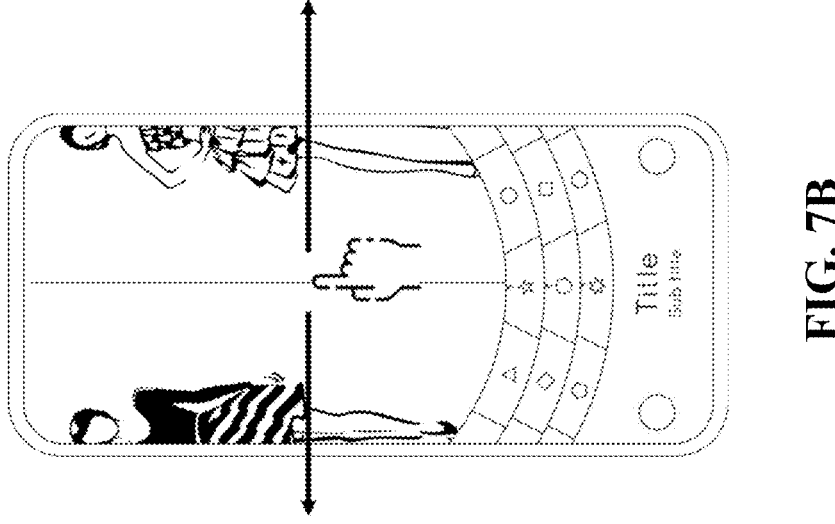
FIG. 7A and FIG. 7B illustrate additional content navigation mechanisms according to one embodiment.
Figure 7A:
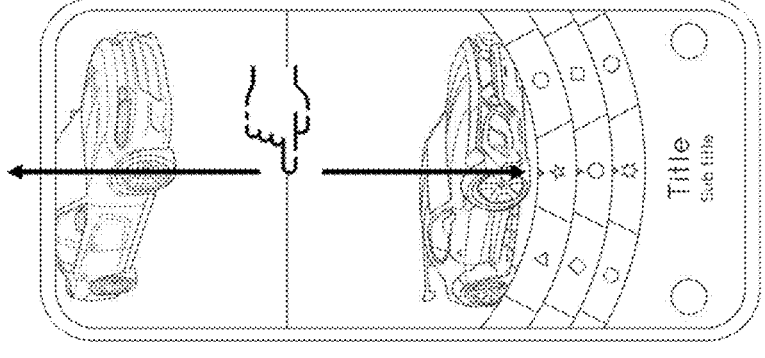

FIG. 7A and FIG. 7B illustrate additional content navigation mechanisms according to one embodiment. A user may swipe up and down (FIG. 7A) or left and right (FIG. 7B) on the content area 120 to view different main subjects. The swiping directions are programmable according to the use case scenarios. FIG. 7A shows an example in which the viewer has swiped up to see the next car model available. FIG. 7B shows another example in which the viewer has swiped left or right to view the next fashion dress available.

Figures 8A, 8B, 8C, 8D:
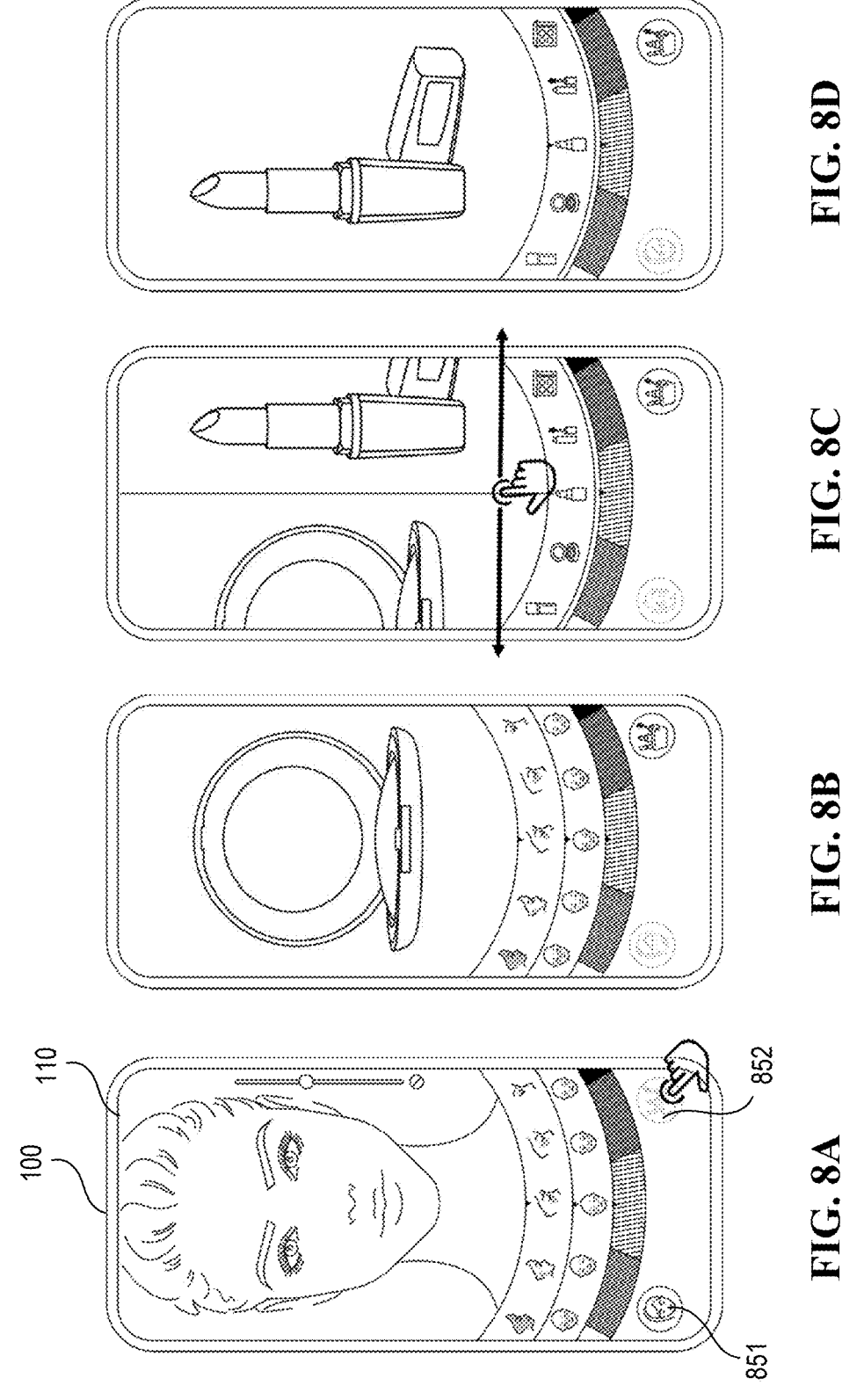
FIG. 8A, FIG. 8B, FIG. 8C, and FIG. 8D illustrate a makeup application use case according to one embodiment.

FIG. 8A, FIG. 8B, FIG. 8C, and FIG. 8D illustrate a makeup application use case according to one embodiment. FIG. 8A illustrates the GUI 110 in a makeup look viewing mode. The GUI 110 displays a face as the main subject, which may be a photo from any source (e.g., from a memory device in the user's device or cloud storage), a selfie, or a live image of the user. The effect of the options selected from the arcs may be informational such as showing different views of the face, or may cause a selected visual effect to modify the displayed content; e.g., by changing the shape, color, shading, etc., of some of the facial features. In one embodiment, the effect of makeup selected from the arcs may be superimposed on the face. Other effects may also be provided.

The GUI 110 allows users to design their looks using user-selectable makeup shapes and colors. In the example of FIG. 8A, the icons on the top arc provide the categories of makeup steps; e.g., foundation, blush, eyeshadow, lipstick, etc. After a user selects a makeup step category (e.g., the blush category), the user may proceed to select a makeup blush shape from the second arc, and a blush color from the third arc.

The GUI 110 also displays one or more view switching buttons, e.g., buttons 851 and 852, which are examples of the virtual buttons 250 in FIG. 2 and FIG. 3A. The button 851 when clicked by the user causes the GUI 110 to display a makeup look view; and the button 852 when clicked by the user causes the GUI 110 to display a makeup product view. In an alternative embodiment, the GUI 110 may include a toggle button that can cause the GUI 110 to toggle between the two views, or cycle through multiple views. It is understood that different software applications may provide different viewing modes and different view switching buttons.

A user can swipe left and right on the content area of the product viewing mode to browse makeup products used in the makeup steps to create the look in the makeup viewing mode. The GUI 110 displays the icons on the arcs corresponding to the categories of the makeup products being viewed.

For example, after the user completes the selection at the powdering makeup step and clicks on a product mode button, the content area switches to show a powder case product (FIG. 8B) that can be used to create the powdered makeup look in the makeup look view. The GUI 110 maintains the display of the arcs at the selected shape and color in the product viewing mode. That is, the displayed icons on the arcs are kept unchanged when the viewing mode changes. FIG. 8C and FIG. 8D show that after entering the product viewing mode, the user may swipe left or right (or up and down) on the content area to see alternative cosmetic products; e.g., powder cases of different brands and/or different types of cosmetic products. Alternatively or additionally, the user may scroll on the top arc to change the makeup product; e.g., to the lipstick products that can be used to create the look in the corresponding makeup look view.

Figure 9:
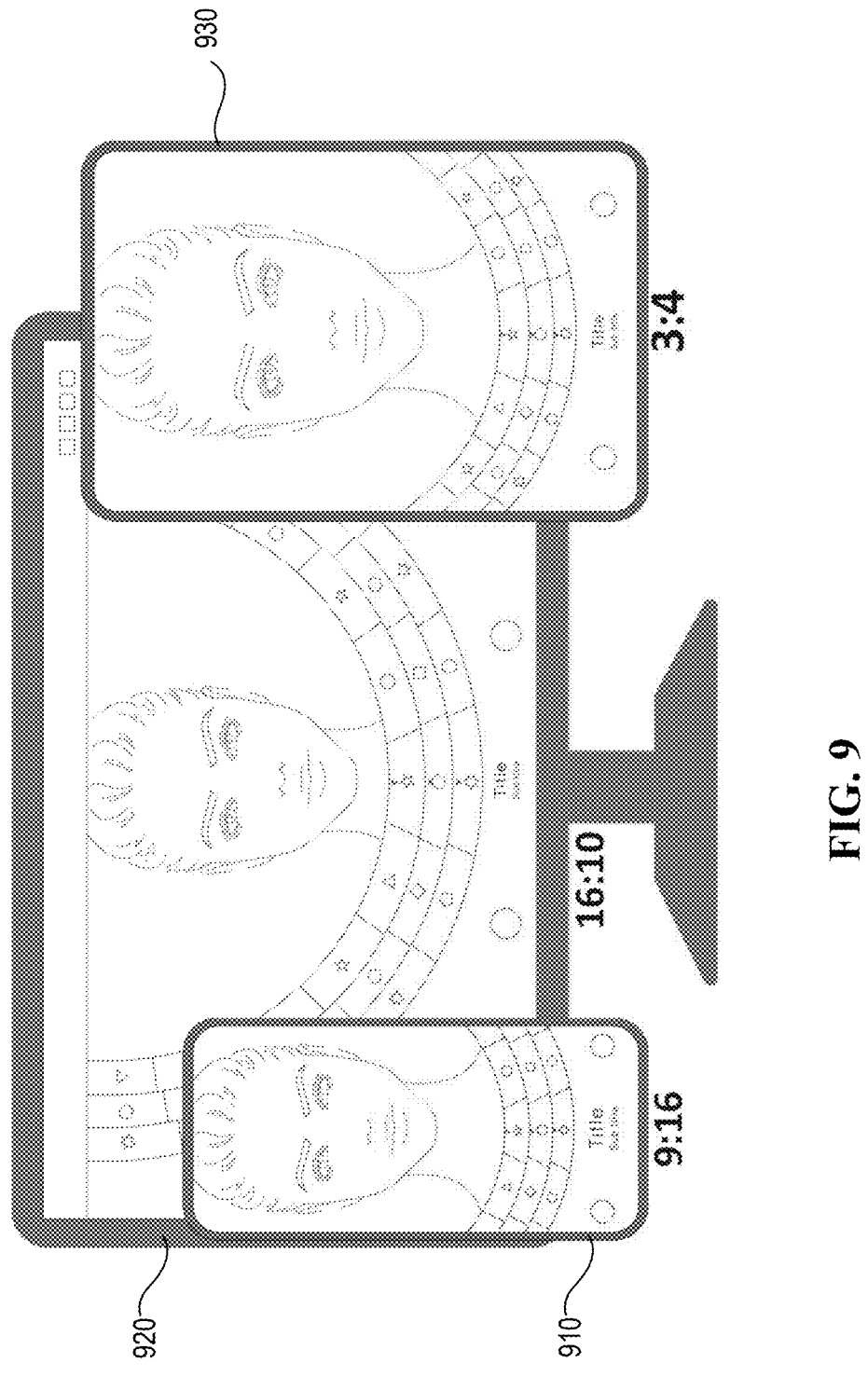
FIG. 9 illustrates a GUI adapted to screens having different aspect ratios according to one embodiment.

FIG. 9 illustrates the GUI 110 adapted to screens with different aspect ratios according to one embodiment. Among screens 910, 920, and 930, screen 910 has the smallest aspect ratio of 9:16 and screen 920 has the largest aspect ratio of 16:10, where aspect ratios are expressed as screen width to height. For example, screen 910 may belong to a mobile device and screen 920 may belong to a desktop screen. The GUI 110 can easily adapt to different aspect ratios without changing the presentation layout. For example, the arcs shown on screen 920 may be an enlarged view of the same arcs on a smaller screen (910 or 930). As each arc is the visible portion of a virtual wheel, enlarging an arc may increase one or more of the following: the radius of the virtual wheel, the thickness of the arc, the length of the arc, the number of icons displayed on the arc, etc. Thus, a bigger screen displays more icons on each arc at a time. In one embodiment, the length of the arcs presented in the GUI 110 is proportional to the width of the screen. It is noted that although the length of the arcs and the number of options displayed on each arc are different on different-sized screens, the full navigation options in each tier remain the same. It is also noted that the screens described herein are not limited to rectangular shapes; the GUI 110 described herein can be provided to any shape of screen including circular, square, or other shapes.

Figure 10:
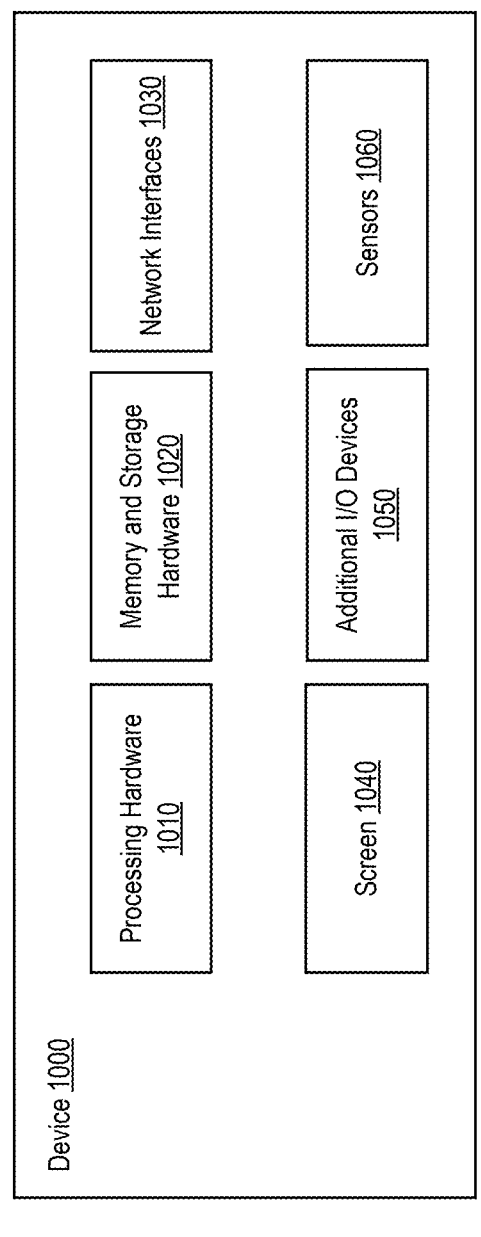
FIG. 10 is a block diagram illustrating an electronic device according to one embodiment.

FIG. 10 is a block diagram illustrating an electronic device 1000 according to one embodiment. The device 1000 may be a computer, a portable computing and communication device (e.g., a smartphone, a laptop, a tablet, etc.), a wearable electronic device, a gaming device, an infotainment device, a navigation device, an Internet-of-things (IOT) device, or any machine capable of executing a set of instructions (sequential or otherwise) to provide a GUI for content navigation, such as the aforementioned GUI 110.

The device 1000 includes processing hardware 1010 such as one or more general-purpose processors and one or more special-purpose processing devices such as a graphic processing unit (GPU), an artificial intelligence (AI) processor, an application specific integrated circuit (ASIC), a field programmable gate array (FPGA), an image processor, a digital signal processor (DSP), a network processor, or the like. In one embodiment, the processing hardware 1010 is operative to execute instructions to provide a GUI for content navigation, such as the aforementioned GUI 110.

In one embodiment, the device 1000 further includes memory and storage hardware 1020 coupled to the processing hardware 1010. The memory and storage hardware 1020 may include memory devices such as dynamic random-access memory (DRAM), static RAM (SRAM), flash memory, and other non-transitory machine-readable storage media; e.g., volatile or non-volatile memory devices. The memory and storage hardware 1020 may further include storage devices, for example, any type of solid-state or magnetic storage device, as well as other forms of computer-readable media. The components of the memory and storage hardware 1020 communicate with each other via a bus or interconnect. In one embodiment, the memory devices 1020 may store the code and data for providing the aforementioned GUI 110 for content navigation. In some embodiments, the memory and storage hardware 1020 may store instructions which, when executed by the processing hardware 1010, cause the processing hardware 1010 to perform the method 1100 of FIG. 11 and/or the method 1200 of FIG. 12.

The device 1000 may further include a network interface device 1030. A part or all of the data and code for the aforementioned GUI may be transmitted or received over a network via the network interface device 1030. The device 1000 also includes a screen 1040 to provide a GUI such as the aforementioned GUI 110. The screen 1040 may be a touchscreen which may be overlaid with touch sensors to detect a user's inputs on the GUI including actions of scrolling, swiping, tapping, holding, clicking, etc. Thus, the GUI may detect a user's input via the touch sensors. Alternatively, the GUI may detect a user's input via other user input devices such as a mouse, a touch pad, a control stick, etc. The device 1000 further includes additional input/output (I/O) devices 1050; e.g., audio and video I/O devices, etc. The device 1000 further includes one or more sensors 1060 to detect a user's gaze, facial features, body parts, clothing items, and/or objects on the user or in the user's surroundings. The sensors 1060 may be used to construct a three-dimensional profile of the user for the processing hardware 1010 to associate the sensor detection output with the selectable options in the aforementioned GUI, such as the icons on the arcs 160 (FIG. 1), the functions of the slider bar 230 (FIG. 2), the disappearance and reappearance of the on-demand widgets, etc. Non-limiting examples of the sensors 1060 include cameras, optical sensors, depth sensors, accelerometers, etc. Optical sensors may include an image sensing device such as a depth-sensing camera, a light detection and ranging (LiDAR) device, etc. It is understood the embodiment of FIG. 10 is simplified for illustration purposes. Additional hardware components may be included.

FIG. 11 and FIG. 12 are flow diagrams illustrating methods 1100 and 1200, respectively, of a GUI for content navigation according to some embodiments. For example, the GUI may be the aforementioned GUI 110, which may operate according to instructions stored in a memory and executed by the device 1000 in FIG. 10 or other devices with capabilities of causing a GUI to perform operations such as receiving and detecting user inputs, and displaying images and graphical objects on a screen. In one embodiment, the GUI may receive and/or detect user input via a touchscreen. Alternatively, the GUI may receive and/or detect user input via another input device such as a mouse, a touchpad, a control stick, etc.

The method 1100 begins at step 1110 when the GUI displays a content area and multiple arcs adjacent to the content area. Each arc is selectable by a user to be a first arc. The arcs include at least the first arc and a second arc, and each of the first arc and the second arc presents icons associated with respective viewable features of a main subject in the content area. The GUI at step 1120 detects a first scroll input on the first arc. The first scroll input moves a first set of icons out of the screen, moves a second set of icons into the screen, and positions a first icon at a designated position to select the first icon. In response to the first scroll input, the GUI at step 1130 displays an automatic scrolling motion of the second arc to present a subset of the icons on the second arc that correspond to the first icon. The GUI at step 1140 detects a second scroll input that selects a second icon from the subset of the icons presented on the second arc. The GUI at step 1150 updates at least one of the viewable features of the main subject in the content area according to operations indicated by at least the first icon and the second icon.

The method 1200 begins at step 1210 when a GUI displays a content area and multiple arcs adjacent to the content area. Each arc presents icons associated with respective viewable features of a main subject in the content area. The GUI at step 1220 detects a user input on a trigger point embedded in the content area. In response to the user input, the GUI at step 1230 displays an automatic scrolling motion on one of the arcs to select a given icon that is associated with the trigger point. The GUI at step 1240 detects one or more additional icons selected on one or more other arcs; and at step 1250 updates the content area according to a first set of operations indicated by at least the given icon and the one or more additional icons.

In one embodiment, the GUI may display, in an information area, the information regarding displayed content in the content area. The information may include a most recent user action that caused a most recent change in the content area. The information may be removed from the GUI after a predefined period of user inaction, and the content area may be enlarged after removal of the information area.

In one embodiment, the GUI may detect a swipe input on the arcs in a first direction away from the content area, and expand one or more of the arcs along the first direction. The GUI may further detect a swipe input on the arcs in a second direction toward the content area, and partially close one or more of the arcs along the second direction.

In one embodiment, the GUI may further display or more virtual buttons, which when selected, change viewing modes of the content area and keep displayed icons on the arcs unchanged. The viewing modes include a makeup look mode to show makeup effects on the main subject, and a makeup product mode to show makeup products used to create the makeup effects. When the GUI receives a swipe input in the content area to display a new content, the GUI changes the displayed icons on the arcs according to the new content. The GUI may change the displayed icons on the arcs by displaying a second automatic scrolling motion on at least one of the arcs In one embodiment, the GUI may further display a multi-function slider bar at a given location on the screen. In response to an input on the slider bar, the GUI presents a result of executing an enabled function of a plurality of functions of the slider bar. The enabled function is dependent on displayed content in the content area. The slider bar may be removed from the given location after a predefined period of unuse, and the GUI displays the slider bar when detecting a tapping input on the given location. The GUI may display multiple functions of the slider bar in response to a click-and-hold input on a draggable button of the slider bar. When the GUI receives an input that selects one of the functions, the selected function of the slider bar is enabled.

In one embodiment, when the GUI detects that the arcs are not in use for a predefined period of time, the GUI displays continuously increasing respective radiuses of the arcs while keeping a center of the arcs at a fixed location until the arcs disappear from the GUI. In one embodiment, the GUI enlarges the content area and the main subject therein in response to a determination that the user's gaze focuses on the main subject for a predefined period of time.

In one embodiment, the designated position on a given arc is marked by a marker, and a first set of icons are currently presented on the given arc. When the GUI detects a click-and-hold input on the marker of the given arc, the GUI displays a set of alternative options in response to the click-and-hold input. In response to a selection of one of the alternative options, the GUI presents a second set of icons on the given arc that are different from the first set of icons.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method of a graphical user interface (GUI) for content navigation on a screen, comprising:

displaying an image in a content area as a main subject and a plurality of arcs adjacent to the content area, the plurality of arcs including at least a first arc and a second arc, each of the first arc and the second arc presenting a plurality of icons thereon, wherein each icon on one of the first arc and the second arc identifies a viewable feature of the main subject, and each icon on the other of the first arc and the second arc identifies a visual effect on one or more viewable features of the main subject;

detecting a first scroll input on the first arc that positions a first icon at a first designated position on the first arc, wherein the first scroll input moves a first set of icons on the first arc out of the screen and a second set of icons on the first arc into the screen;

in response to the first scroll input on the first arc, displaying an automatic scrolling motion of the second arc to present a subset of the icons on the second arc that correspond to the first icon;

detecting a second scroll input on the second arc that positions a second icon at a second designated position on the second arc; and displaying, according to at least the first icon and the second icon, a given visual effect on a given viewable feature of the main subject that is currently displayed in the content area.

2. The method of claim 1, further comprising:

detecting an input on a trigger point embedded in a selected viewable feature of the main subject in the content area;

in response to the input, displaying another automatic scrolling motion of one of the arcs to select a given icon that is associated with the selected viewable feature;

detecting one or more additional icons selected on one or more other arcs; and displaying a selected visual effect on the selected viewable feature of the main subject currently displayed in the content area according at least the given icon and the one or more additional icons.

3. The method of claim 1, wherein the arcs are portions of concentric wheels displayed on the screen, each of the arcs having a first end, a second end, and a middle section that curves away from the content area.

4. The method of claim 1, further comprising:

displaying, in an information area of the GUI, information regarding displayed content in the content area, the information including a most recent user action that caused a most recent change in the content area.

5. The method of claim 4, further comprising:

removing the information area from the GUI after a predefined period of user inaction; and enlarging the content area after removal of the information area.

6. The method of claim 1, further comprising:

detecting a swipe input on the arcs in a first direction away from the content area; and expanding one or more of the arcs along the first direction.

7. The method of claim 1, further comprising:

detecting a swipe input on the arcs in a second direction toward the content area; and partially closing one or more of the arcs along the second direction.

8. The method of claim 1, further comprising:

displaying one or more virtual buttons, which when selected, change viewing modes of the content area and keep displayed icons on the arcs unchanged.

9. The method of claim 8, wherein the viewing modes include a makeup look mode to show makeup effects on the main subject, and a makeup product mode to show makeup products used to create the makeup effects.

10. The method of claim 1, further comprising:

displaying a multi-function slider bar at a given location on the screen; and in response to an input on the slider bar, presenting a result of executing an enabled function of a plurality of functions of the slider bar, wherein the enabled function is dependent on displayed content in the content area.

11. The method of claim 10, further comprising:

removing the slider bar from the given location after a predefined period of unuse; and displaying the slider bar when detecting a tapping input on the given location.

12. The method of claim 1, further comprising:

detecting that the arcs are not in use for a predefined period of time; and continuously increasing respective radiuses of the arcs while keeping a center of the arcs at a fixed location until the arcs disappear from the GUI.

13. The method of claim 1, further comprising:

enlarging the content area and the main subject therein in response to a determination that a user's gaze focuses on the main subject for a predefined period of time.

14. The method of claim 1, wherein a designated position on a given arc is marked by a marker, the method further comprising:

detecting a click-and-hold input on the marker of the given arc, wherein a first set of icons are currently presented on the given arc;

in response to the click-and-hold input, displaying a set of alternative options; and in response to a selection of one of the alternative options, presenting a second set of icons on the given arc that are different from the first set of icons.

15. A device comprising:

a screen;

one or more processors; and a memory to store instructions, which when executed by the one or more processors, cause a graphical user interface (GUI) on the screen to:

display an image in a content area as a main subject and a plurality of arcs adjacent to the content area, each of the plurality of arcs including a first arc and a second arc presenting a plurality of icons thereon, wherein each icon on the first arc identifies a viewable feature of the main subject, and each icon on the second arc identifies a visual effect on one or more viewable features of the main subject;

detect a user input on a trigger point embedded in a given viewable feature of the main subject in the content area;

in response to the user input on the trigger point, display an automatic scrolling motion of the first arc that positions a given icon associated with the selected viewable feature at a designated position on the first arc, wherein the automatic scrolling motion moves a first set of icons on the first arc out of the screen and a second set of icons on the first arc into the screen;

detect a second icon selected on the second arc; and display, according to at least the first icon and the second icon, a given visual effect on the given viewable feature of the main subject that is currently displayed in the content area.

16. The device of claim 15, wherein the one or more processors further cause the GUI to:

superimpose the given visual effect on the given viewable feature of the main subject that is currently displayed in the content area.

17. The device of claim 15, wherein the one or more processors are further operative to:

receive an input on a virtual button in the GUI;

cause the GUI to change a first viewing mode into a second viewing mode of the content area in response to the input while keeping displayed icons on the arcs unchanged;

receive a swipe input in the content area to display a new content; and cause the GUI to change the displayed icons on the arcs according to the new content.

18. The device of claim 17, wherein the one or more processors are further operative to cause the GUI to change the displayed icons on the arcs by displaying a second automatic scrolling motion on at least one of the arcs.

19. The device of claim 15, wherein the one or more processors are further operative to:

cause the GUI to display a multi-function slider bar on the screen;

display a plurality of functions of the slider bar in response to a click-and-hold input on a draggable button of the slider bar; and enable one function of the plurality of functions of the slider bar according to an input that selects one of the plurality of functions.

20. The device of claim 15, further comprises a plurality of image sensors to detect a user's gaze, wherein the one or more processors are further operative to cause the GUI to enlarge the content area and the main subject therein in response to a determination that the user's gaze focuses on the main subject for a predefined period of time.

* * * * *